April 29, 1958 H. CHEVALLAZ 2,832,258
CINEMATOGRAPHIC CAMERAS

Filed June 3, 1955 3 Sheets-Sheet 1

INVENTOR
HENRI CHEVALLAZ

April 29, 1958 — H. CHEVALLAZ — 2,832,258
CINEMATOGRAPHIC CAMERAS

INVENTOR
HENRI CHEVALLAZ

2,832,258

Patented Apr. 29, 1958

2,832,258

CINEMATOGRAPHIC CAMERAS

Henri Chevallaz, Yverdon, Switzerland, assignor to Paillard S. A., Sainte-Croix, Switzerland, a corporation of Switzerland Application June 3, 1955, Serial No. 513,029

Claims priority, application Switzerland June 16, 1954

1 Claim. (Cl. 88—17)

Some cinematographic cameras are provided with a device for automatically loading the film comprising two loop forming members located at the entry and outlet of the passage of the camera. The loop forming members, in known cameras, are generally provided in such a manner as to be capable of occupying two positions, one turned down towards the film gate (loading position) allowing of the automatic formation of two loops of well defined dimensions, the other offset allowing of complete freedom of movement of the film loops. The changing in position of the loop forming members is obtained by a control handle.

However, experience has proved that the user may often forget to effect the manual control of withdrawal of the loop forming members, after loading the camera. It will be evident that this has the disadvantage of enabling the camera to function with the loop forming members in the loading position, resulting in a defective filming and unsatisfactory fixety of the image, as also wear and scratching of the film.

The present invention has for its object to remedy the above mentioned disadvantage and to provide a cinematographic camera provided with a device for the automatic loading of the film comprising loop forming members located at the inlet and at the outlet from the film gate of the camera and capable of occupying two positions of which one is curved towards the film gate allowing of automatic formation of the loops of the film, during charging, the other retracted so as to provide complete freedom of movement for the loops. The said camera is distinguished from known cameras, by the fact that the said device comprises means adapted to be actuated by the cover of the camera, when it is being closed, so as to produce automatically the passage of the loop forming members from their loading position to their retracted position out of the path of the film.

One form of construction of the camera according to the invention is shown diagrammatically and by way of example in the accompanying drawings, wherein.

Figure 1:
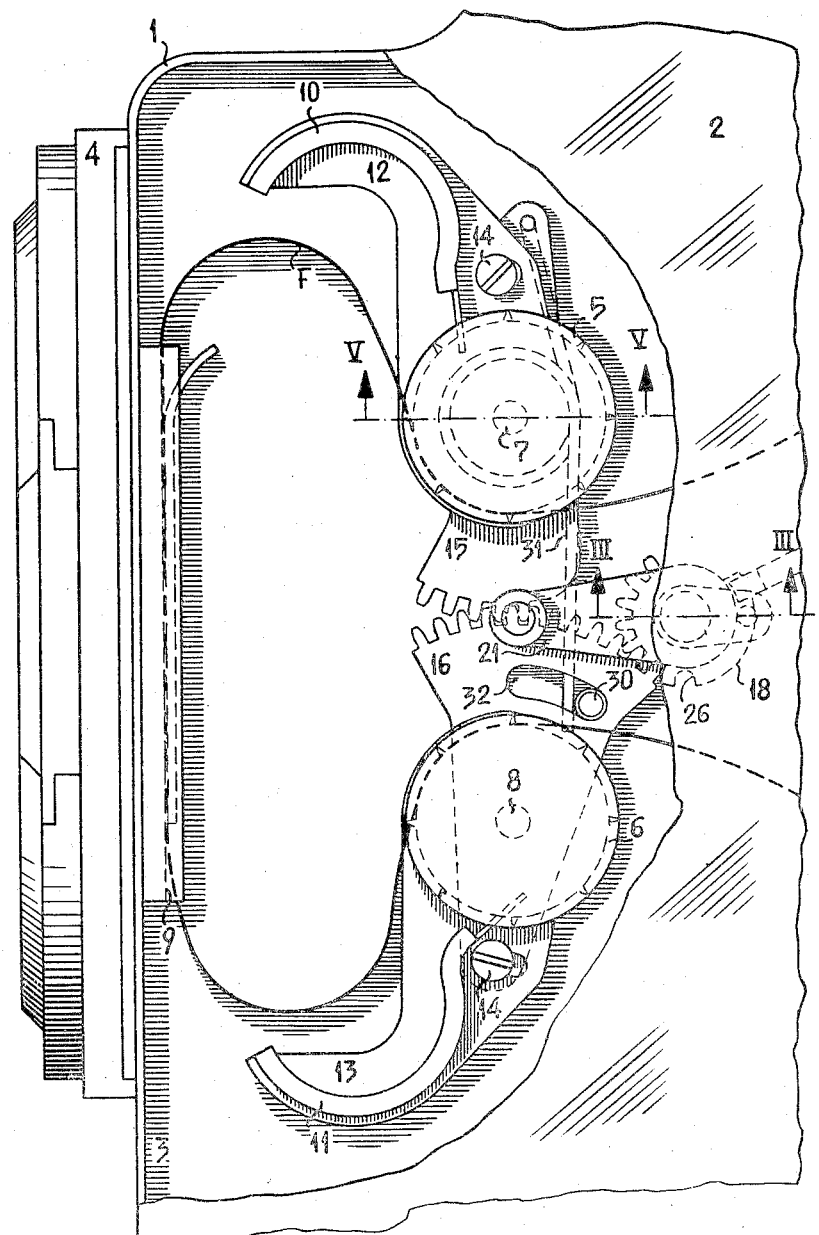
Fig. 1 shows a portion of the loaded camera, the cover being closed, but broken away so as to show the device for automatic charging in the normal position.

The cinematographic camera, of which a portion is shown in Fig. 1, comprises a casing 1, a cover 2, a plate 3 and a turret 4 adapted to receive objectives. Two sprocket wheels 5 and 6 each mounted on a spindle 7, 8 respectively, and driven in rotation by the mechanism (not shown) of the camera, ensuring continuous driving of the film F. The latter is held against the said sprocket wheels by lugs, not shown in the drawing. Between the sprocket wheels 5 and 6, the film passes into a film gate 9 where it is fed intermittently by a claw (not shown).

Figure 3:
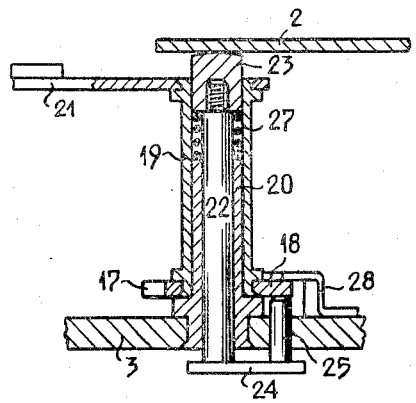
Fig. 3 is a section on the line III—III of Fig. 1.

The device for the automatic loading comprises two loop forming members 10 and 11 carried by two arms 12 and 13, each pivoted about one of the spindles 7, 8 respectively. Each of the said arms 12 and 13 is, further, secured by means of a screw 14, on a toothed segment 15, 16 respectively. The teeth of the segments 15 and 16 interengage with one another; the teeth of the segment 16 being further, in engagement with the teeth 17 of a cam 18. The latter is secured to the end of a barrel 19 (Fig. 3) loosely mounted on a hollow stationary spindle 20 secured to the plate 3. To the other end of the barrel 19 is secured a crank 21 provided for controlling the angular movement of the barrel and, consequently of the cam 18 secured to the latter. Through the hollow spindle 20 passes a rod 22 carrying at one of its ends a piston 23 capable of sliding in the said barrel 19 and at its other end a plate 24 to which is secured a finger 25 parallel to the rod 22. The finger 25 passes through the plate 3 for co-operating with a notch 26 provided in the cam 18. In the interior of the barrel 19, between the end of the hollow spindle 20 and the piston 23, is located a coiled spring 27 surrounding the rod 22. The action of the said spring tends to cause the piston 23 to leave the barrel 19 and, consequently, to move the rod axially upwards relatively to Fig. 3. Equilibrium is established when the finger 25 abuts against the cam 18, or, when the finger 25 is located opposite the notch 26, when the plate 24 abuts against the plate 3. An angle piece 28 secured to the plate 3 bears against the cam 18 preventing this, and consequently the barrel 19, from moving axially on the hollow spindle 20.

A steel wire hooked to the end of the segment 15 and bearing, after having made a turn about the bearing 29 of the spindle 7, on the pin 30 secured to the plate 3, forms a flexible spring 31 tending to maintain the segment 15 and, consequently the arm 12 and the two loop forming members in the position indicated in Fig. 1. The pin 30 passes through an arcuate opening 32 provided in the segment 16.

Figure 2:
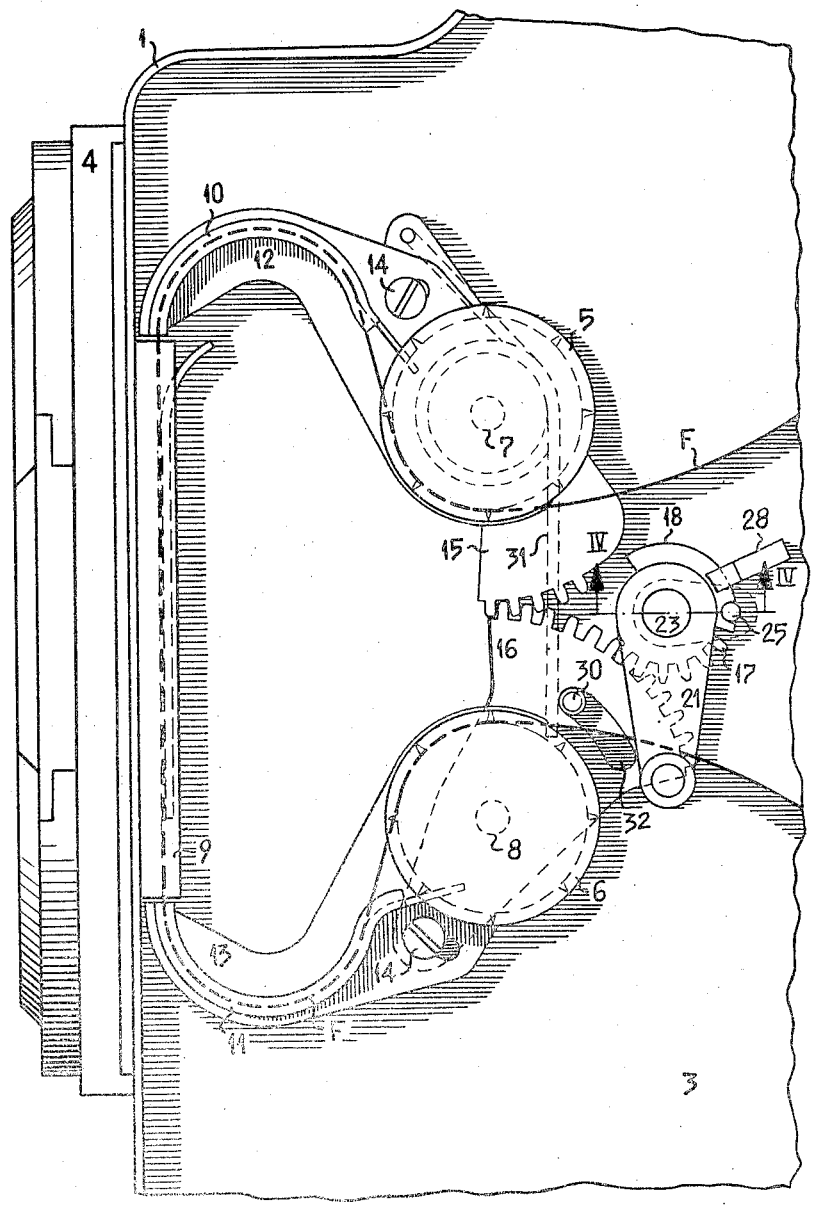
Fig. 2 is similar to the preceding figure, but showing the cover open and the device in the loading position.
Figure 4:
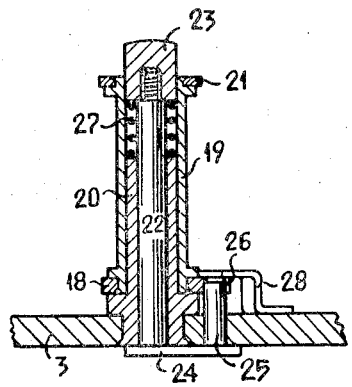
Fig. 4 is a section on the line IV—IV of Fig. 2.
Figure 5:
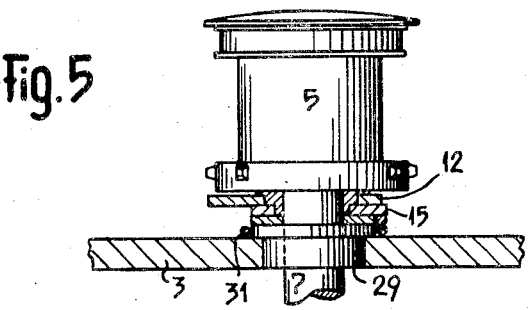
Fig. 5 is a section on the line V—V of Fig. 1.

The device for the automatic charging and the automatic formation of the two loops, functions in the following manner:

When the cover 2 is opened, the various members of the camera are in the position shown in Fig. 1. For placing the camera in the charging position, the crank 21 is actuated by pulling it in the direction of the sprocket wheel 6, which causes the barrel 19 to turn on the hollow spindle 20 in a counter-clockwise direction. As the cam 18 is secured to the barrel 19 it moves angularly and by its teeth 17 meshing with the teeth of the segment 16 causes the latter to pivot about the spindle 8, in such a manner as to lower the loop forming member 11 towards the film gate 9. As the teeth of the segment 16 are in engagement with the teeth of the segment 15, the latter also pivots about the spindle 7, against the action of the spring 31 so that the loop forming member 10 is also lowered toward the film gate 9. When the two loop forming members 10 and 11 have reached the charging position, the finger 25 is opposite the notch 26 and engages with this under the action of the spring 27 (see Figs. 2 and 4), in such a manner as to prevent any angular movement of the cam 18, thus locking the loop forming members 10 and 11 in the charging position against the action of the spring 31. The device, of which the various members occupy the position shown in Fig. 2 is ready for effecting automatic loading.

After having effected the loading, the cover 2 is closed. The cover, before having been entirely closed, abuts against the piston 23 and pushes it into the interior of the barrel 19 against the action of the spring 27. As the piston 23 is secured to the rod 22 it moves this axially thus producing the disengagement of the finger 25 from the notch 26, thus the unlocking of the cam 18. Thus, under the action of the spring 31, the segment 15 pivots on the spindle 7 in the direction of withdrawing the loop forming member 10 from the film gate 9. Simultaneously, the teeth of the segment 15 in engagement with the teeth of the segment 16 cause the latter to pivot in such a manner as also to withdraw the loop forming member 11 from the film gate 9. When the end of the arcuate opening 32 contacts the pin 30, the movement is stopped and the various members of the device again occupy the original position shown in Figs. 1 and 3.

As will be seen from the foregoing description, the inconvenience of being able to cause the camera to operate with the loop forming members in the loading position is eliminated, in the camera above described, the withdrawal of the loop forming members being effected automatically during the closing of the cover.

Numerous modifications in construction may be provided for the film loading device and the automatic withdrawal of the loop forming members during the closing of the cover of the camera. Thus, for example, the cam 18, the barrel 19 and the crank 21 may be omitted, the locking device with a sliding piston 23 and the locking finger 25 being provided for acting directly on one of the toothed segments 15 or 16. In this case, the setting of the loop forming members 10 and 11 is effected by acting directly on one thereof, against the action of the spring 31 until the locking device maintains them against the film gate 9 by engagement of the finger 25 with a notch provided in one of the segments 15 or 16.

The closing of the cover 2 produces a movement of the piston 23 and of the finger 25, thus releasing the toothed sectors and the loop forming members which return to their retracted position under the action of the spring 31.

I claim:

In a motion picture camera including an objective lens, the combination comprising a casing, a film gate positioned within said casing in operative relationship with the objective lens, said casing including a plate member, said film gate including a film entrance and a film exit, a first spindle member and a second spindle member mounted on said plate in spaced relationship to each other, a first film sprocket member rotatably mounted on said first spindle member, a second film sprocket member rotatably mounted on said second spindle member, a first arm member pivotally mounted on said first spindle member, a second arm member pivotally mounted on said second spindle member, a first toothed segment member pivotally mounted on said first spindle member and fixedly attached to said first arm member, a second toothed segment member pivotally mounted on said second spindle member and fixedly attached to said second arm member, the teeth of said first toothed segment member and the teeth of said second toothed segment member being positioned opposite to each other and in mesh with each other, a first film loop forming member fixedly attached to said first arm member at the end thereof opposite to the end of the first toothed segment member having said teeth, a second film loop forming member fixedly attached to said second arm member at the end thereof opposite to the end of second toothed segment member having said teeth, a pin member fixedly attached to said plate, said second toothed segment member having an arcuate opening therethrough, said pin member being positioned on said plate member to be received in said arcuate opening, spring means for urging said first toothed segment member, said first arm member attached thereto and said first film loop forming member fixedly attached to said first arm member away from said film gate, whereby said second toothed segment member, said second arm member attached thereto and said second film loop forming member fixedly attached to said second arm member are likewise urged away from said film gate at the film entrance and the film outlet thereof, said spring means being fixedly attached to said first toothed segment member at one end thereof and operatively associated with said first spindle member and bearing on said pin member at the other end thereof, means for locking both said first and second film loop forming members and their respective associated arm members and toothed segment members in a position toward said film gate for maintaining against said spring means said first and second film loop forming members against said film gate, said means including a hollow stationary spindle mounted in said plate and therethrough, a barrel member loosely mounted about said hollow spindle, a toothed cam member angularly secured to said barrel adjacent one end thereof adjacent the plate member and within said casing, said toothed cam member having a notch, said toothed cam member engaging said second toothed segment member, the respective teeth of said cam member and said second toothed segment member being in mesh, a crank member fixedly attached to said barrel member at the other end thereof, a rod member positioned within said hollow stationary spindle, one end of said rod extending beyond one end of said stationary spindle and said plate member and the other end of said rod extending beyond the other end of said stationary spindle but being within said barrel member, a small plate member fixedly attached to said rod member at the said one end thereof, a finger means fixedly attached to said small plate member and extending through said casing plate member for engaging said cam member at the notch therein, a piston member positioned in said barrel member at the end thereof adjacent said crank member, and a second spring means positioned about said rod member at the said other end thereof and within said barrel member for urging said piston member out from said barrel member, and a casing cover means for actuating said piston member upon the closing thereof, said cover means being operatively attached to said casing opposite to said plate, whereby said film loop forming members are first maintained away from said film gate and then maintained against said film gate when the cover means is open, whereby said camera can be automatically loaded with film upon the cover means being in open position and the film loop forming members being maintained against the film gate, and whereby the camera can be operated with the film loop forming members positioned away from said film gate upon the cover means being in closed position, thereby preventing defective filming, unsatisfactory focusing, and wear and scratching of the film.

References Cited in the file of this patent

UNITED STATES PATENTS

| | | |
|---|---|---|
| 1,402,273 | Wenderhold | Jan. 3, 1922 |
| 1,522,395 | Thomas | Jan. 6, 1925 |
| 2,203,655 | Lechleitner et al. | June 4, 1940 |
| 2,327,857 | Bolsey | Aug. 24, 1943 |
| 2,396,243 | Boisselier | Mar. 12, 1946 |
| 2,420,587 | Dietrich | May 13, 1947 |

FOREIGN PATENTS

| | | |
|---|---|---|
| 244,068 | Switzerland | Feb. 17, 1947 |
| 471,740 | Canada | Feb. 27, 1951 |